United States Patent [19]

Fougeres et al.

[11] Patent Number: 5,279,440
[45] Date of Patent: Jan. 18, 1994

[54] TAMPERPROOF PACKAGING HAVING AN INNER ENVELOPE AND AN OUTER ENVELOPE

[75] Inventors: Michel Fougeres, Ouzouer-sur-Trezee; Philippe Partenay, Louveciennes, both of France

[73] Assignee: Novembal SA, Clichy, France

[21] Appl. No.: 855,631

[22] PCT Filed: Sep. 5, 1991

[86] PCT No.: PCT/FR91/00711
§ 371 Date: May 5, 1992
§ 102(e) Date: May 5, 1992

[87] PCT Pub. No.: WO92/04252
PCT Pub. Date: Mar. 19, 1992

[30] Foreign Application Priority Data

Sep. 5, 1990 [FR] France ............... 90 11019

[51] Int. Cl.⁵ .................. B65D 5/56; B65D 5/72
[52] U.S. Cl. .................. 220/410; 53/449;
53/456; 220/449; 220/465
[58] Field of Search ............ 220/408, 410, 411, 445,
220/449, 468, 465; 53/173, 449, 453, 456, 469,
471

[56] References Cited

U.S. PATENT DOCUMENTS

| | | | |
|---|---|---|---|
| 2,954,901 | 10/1960 | Winstead | 220/410 |
| 3,039,648 | 6/1962 | Busch | 220/410 |
| 3,246,825 | 4/1966 | Zastrow | 220/465 |
| 3,893,280 | 7/1975 | King | 53/449 |
| 4,019,628 | 4/1977 | Derby | 220/449 |
| 4,350,002 | 9/1982 | Focke | 53/449 |
| 4,502,514 | 3/1985 | Ballard et al. | 53/449 |
| 4,874,621 | 10/1989 | Loughrin | 53/449 |
| 4,927,042 | 5/1990 | Ring | 220/410 |
| 4,982,867 | 1/1991 | Dubois et al. | 220/410 |

FOREIGN PATENT DOCUMENTS

| | | | |
|---|---|---|---|
| 625230 | 3/1962 | Belgium . | |
| 0359968 | 3/1990 | European Pat. Off. . | |
| 3139083 | 12/1982 | Fed. Rep. of Germany . | |
| 2198867 | 4/1974 | France . | |
| 8602958 | 6/1988 | Netherlands | 220/408 |
| 944565 | 12/1963 | United Kingdom . | |

Primary Examiner—Gary E. Elkins
Attorney, Agent, or Firm—Young & Thompson

[57] ABSTRACT

Packaging comprising a rectangular parallelepipedal molded plastic inner can having a capacity of about one to five liters and having elongated stiffening grooves molded therein. The can has relatively large opposite side walls and relatively narrow opposite end walls and top and bottom walls and having a neck surrounding a discharge opening. The neck is disposed in an upper corner of the can on a length of wall of the can that is disposed at an acute angle to a vertical axis of the can. The opening has an axis disposed at an angle of about 15° to 30° to the vertical axis of the can. A stopper is provided for opening and closing the opening. The can has over most of its extent a thin wall that is about 3/10ths of a millimeter thick but has a thicker wall adjacent the neck. A cardboard outer envelope closely surrounds and contacts and supports the can. The envelope is of a single piece having fold lines that define rigid panels. The envelope has a portion through which the stopper is visible but through which the stopper cannot be removed without destruction of a portion of the packaging.

17 Claims, 7 Drawing Sheets

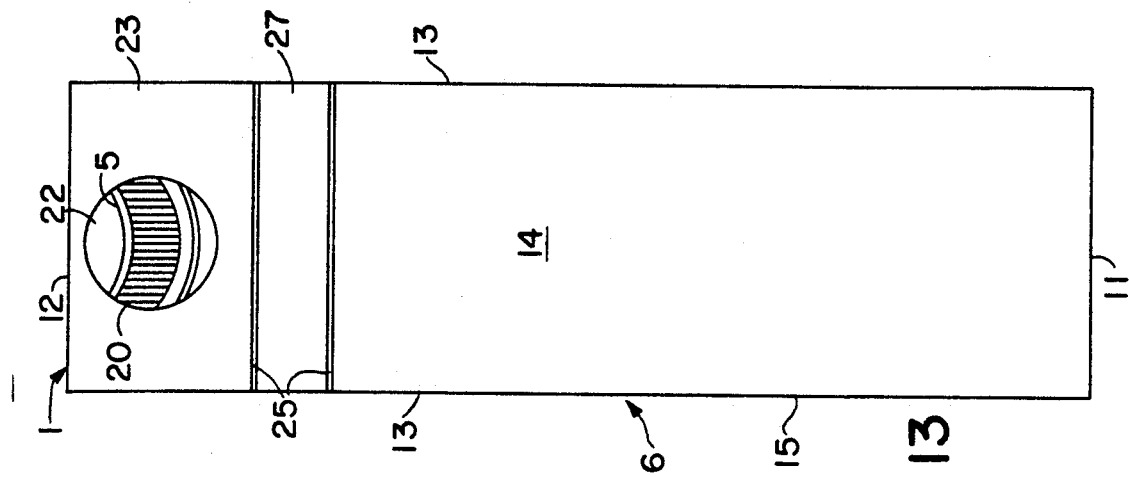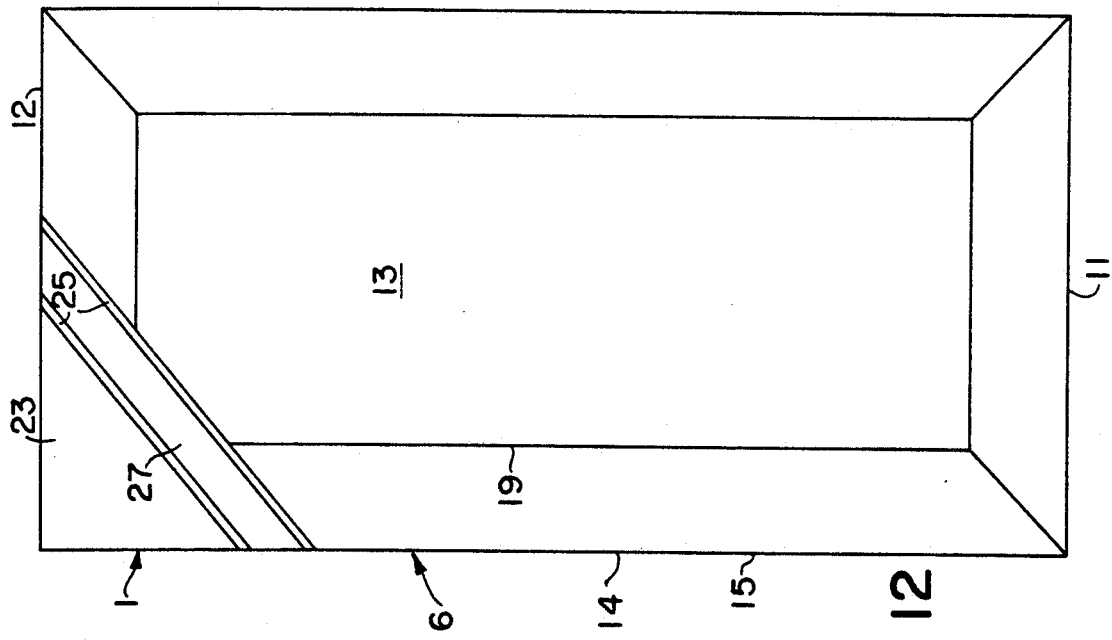

TAMPERPROOF PACKAGING HAVING AN INNER ENVELOPE AND AN OUTER ENVELOPE

The invention relates to tamperproof packaging having an inner envelope and an outer envelope.

The following various different forms of packaging are already known for contents such as beverages, cleaning materials, cosmetics (or equivalents) that are liquid, semiliquid, or solid, and that are for individual or nearindividual use:

bottles, flasks, jars, cans, pots (or equivalents), in particular made of plastic by extrusion blow-molding high density polyethylene. Such packaging is freestanding and substantially undeformable, being about 8/10-ths of a millimeter thick, for example, for contents of the order of one liter or one-and-a-half liters. Reference may be made, for example, to Document DE-A-3 139 083 which describes a plastic container including stiffening projections. When so desired, such packaging includes a tamperproof stopper or capsule, with tamperproofing being provided by the special structure given to the stopper or to the capsule.

Bags or sachets for liquids, generally intended for providing a single dose of a consumable, having no opening or associated closure member, and with the limitations in use that stem therefrom.

Cases, boxes, or crates made of cardboard or of complex materials that may be folded or not. Such packaging generally includes an opening that results from disconnecting flaps that were previously stuck or stapled together. For that reason, such packaging cannot be effectively and repeatedly closed after use.

Bag-in-boxes each comprising an outer envelope in the form of a cardboard box together with a flexible inner envelope in the form of a bag which is held and carried by the outer box. Either the inner envelope merely lines the inside of the outer box, in which case the packaging suffers from the same opening and closing defects as the above-mentioned cardboard boxes or the like, or else it is provided with opening and closing means in the form of a cock, plug, or capsule. In both cases the inner bag remains rigidly fixed to the outer envelope at some positions and filling such packaging is complex. When a cock, plug, or capsule is provided, the packaging either has no tamperproofing means, or else it has such tamperproofing means forming an integral portion of the cock, plug, or capsule.

The state of the art can be illustrated in particular by the following documents: GB-A-1 466 854 which relates to packaging derived from the general bag-in-box type packaging having a non-tamperproof closure plug. U.S. application Ser. No. 4 169 540, U.S. application Ser. No. 4 413 464, U.S. application Ser. No. 4 715 511, and EP-A-0 359 968, which relate to outer boxes having flexible inside envelopes and no tamperproof closure system. EP-A-0 134 147 which relates to packaging for a liquid under pressure such as a carbonated beverage, the packaging comprising a rigid outer envelope such as a cask, a flexible inner envelope, a removable cover constituting a piston, and a discharge cock at the bottom. That packaging is complex and poorly adapted to individual use. It has no tamperproofing. FR-A-2 594 098 relates to packaging having two casks one inside the other, filling taking place between them, and a cover being optional. FR-A-2 198 867 relates to a can constituted by a cardboard box provided with a cover that can be folded down, and by a tank of plastic material that is intimately engaged in the cardboard and is itself provided with a spring cover.

Document BE-A-625 230 describes composite packaging having an outer envelope and an inner can secured inside the outer envelope but detachable therefrom. It is optionally necessary to add reinforcement interposed between the outer envelope and the inner can in order to obtain the required rigidity and strength. That packaging, like the packaging of the same type described in Document GB-A-944 565, has no tamperproofing and requires the use of relatively large quantities of materials that are not biodegradable or that are poorly biodegradable.

An object of the invention is to mitigate these drawbacks or limits of known packaging, and more particularly to provide packaging for specific applications mentioned above while, in combination: being cheap, particularly since it includes a minimum of expensive raw materials required in its manufacture; having a closure system that is removable and reusable; being tamperproof (i.e. any opening or breaking of the packaging is visible); being safe (in particular having sufficient overall rigidity to stand up to shock or to pressure); being easily handled by a user and more particularly making it easy to pour out its contents via its opening; being easily stored (in particular being of well-known dimensions and shape, suitable for being juxtaposed and/or stacked); and having large visible outside surfaces suitable for carrying messages, instructions, or decorations, for advertising or information purposes.

Another object of the invention is to provide packaging of this type which is suitable for household use, in particular since it occupies a small amount of volume, thereby making storage easy, and with its weight and shape enabling it to be held in one hand only while making pouring easy (in particular by acting on the size of the packaging, the use of a minimum amount of raw materials, and by having a neck axis that is inclined and off-center).

Another object of the invention is to provide packaging of this type which is advantageous from the ecological point of view in particular because, other things being equal, it includes a minimum of materials that are not biodegradable or that are poorly biodegradable, and/or that are polluting, and/or that are dangerous, and because it can be taken apart easily with a minimum number of operations into its various different component materials which can be discarded by the user into separate garbage collectors, in particular one for cardboard or paper and another for plastic, and because it can be crushed or compressed.

To this end, the present invention provides packaging of the type for individual use and of the type that is generally in the form of a rectangular parallelepiped, comprising:

an inner can based on shaped plastic, such as high density polyethylene, having a neck at its top defining an opening for discharging its content;

a stopper co-operating releasably with the opening of the can and capable of being reused; and an outer envelope based on cardboard or equivalent material, shaped around the can to support it while leaving its neck and stopper accessible during use;

the packaging being intended more particularly for packaging liquid or powder substances that are used in successive fractions; and being characterized in that:

the inner can has a thin wall that is about 3/10-ths of a millimeter thick, which wall is not totally flexible but is deformable substantially under the action of external stresses due to manual handling; said wall being thickened and substantially undeformable under the action of external handling and closing stresses in the zone of the neck and of the discharge opening; said wall including axially and/or transversely elongate stiffening grooves; and the volume of the can being more particularly of the order of one liter to five liters;

the envelope has two small side walls that are a few centimeters wide and that are less than about 10 cm wide so as to enable the envelope to be held in one hand, the palm being pressed against a first small side wall and the fingers being pressed against the two large front walls;

the neck is situated so as to be off-center sideways towards the second small side wall and it slopes outwards relative to the axis of the packaging through an angle of about 15° to 30°, being situated on a length of wall that also slopes relative to the axis on the packaging and that is situated in the top corner of the can; and the top of the envelope fits closely over the shape of the can; the envelope being constituted as a single piece including fold lines that define foldable panels or flaps that can be associated rigidly together, one of which is adjacent to the second small side wall and is pierced by a hole through which the neck of the can passes.

In another aspect, the invention provides packaging for individual use of the type that is generally in the form of a rectangular parallelepiped and comprising:

an inner can based on shaped plastic such as high density polyethylene having a neck at its top that defines an opening for discharging a content;

a screw stopper movably co-operating with the opening of the can and capable of being reused; and an outer envelope based on cardboard or the equivalent, shaped around the can to hold it while leaving its neck and its stopper accessible in use;

the packaging being intended more particularly for packaging substances that are in liquid or powder form and that are used in successive fractions; and being characterized by the fact that:

the outer envelope is either in a non-broken state where it substantially surrounds the stopper, or else in a state where utilization is possible and in which the stopper is operable and can be removed, the neck projecting from the outer envelope;

the outer envelope in the non-broken state including at its stopper end a breakable portion enabling it to pass to a state in which utilization is possible where the breakable portion is movable or separable, and having an opening allowing the stopper to be seen while not enabling it to be removed naturally; and the outer envelope constituting a tamperproofing means of the packaging.

The other characteristics of the invention will be well understood from the following description made with reference to the accompanying drawings, in which.

Figure 8:
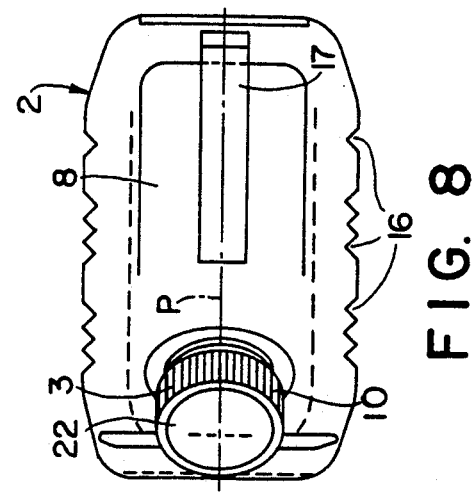
Figure 7:
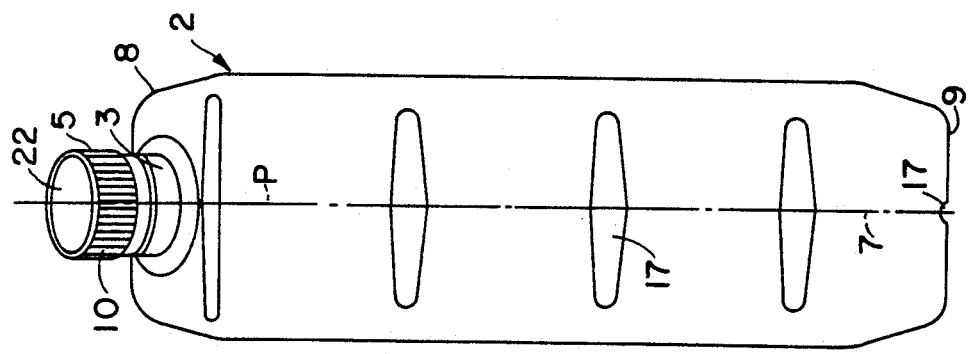
Figure 6:
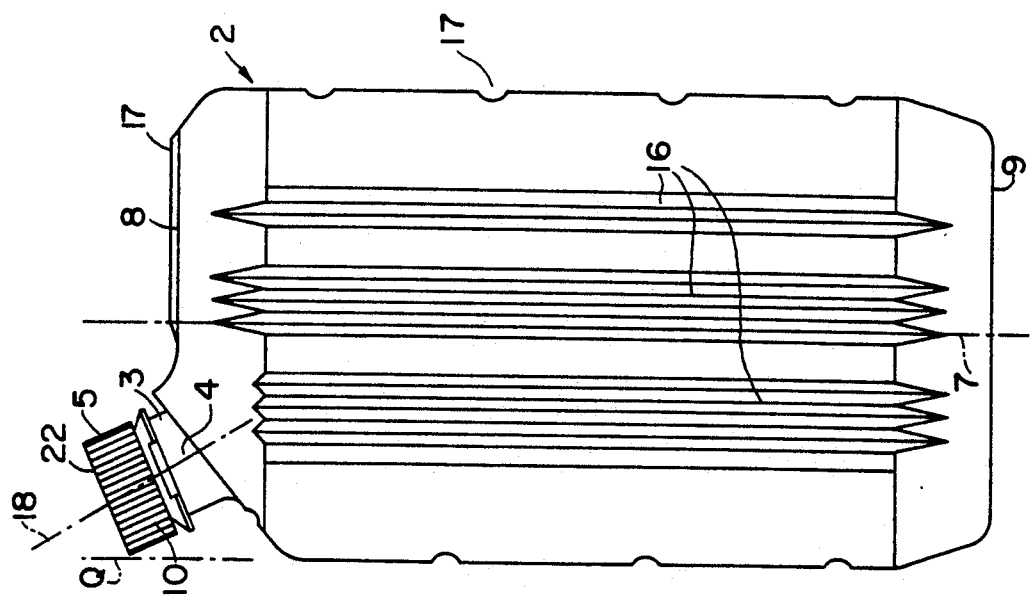

FIGS. 6, 7, and 8 are three views respectively in elevation, from the left, and from above, showing the inner can of packaging of the invention on its own.

Figure 1:
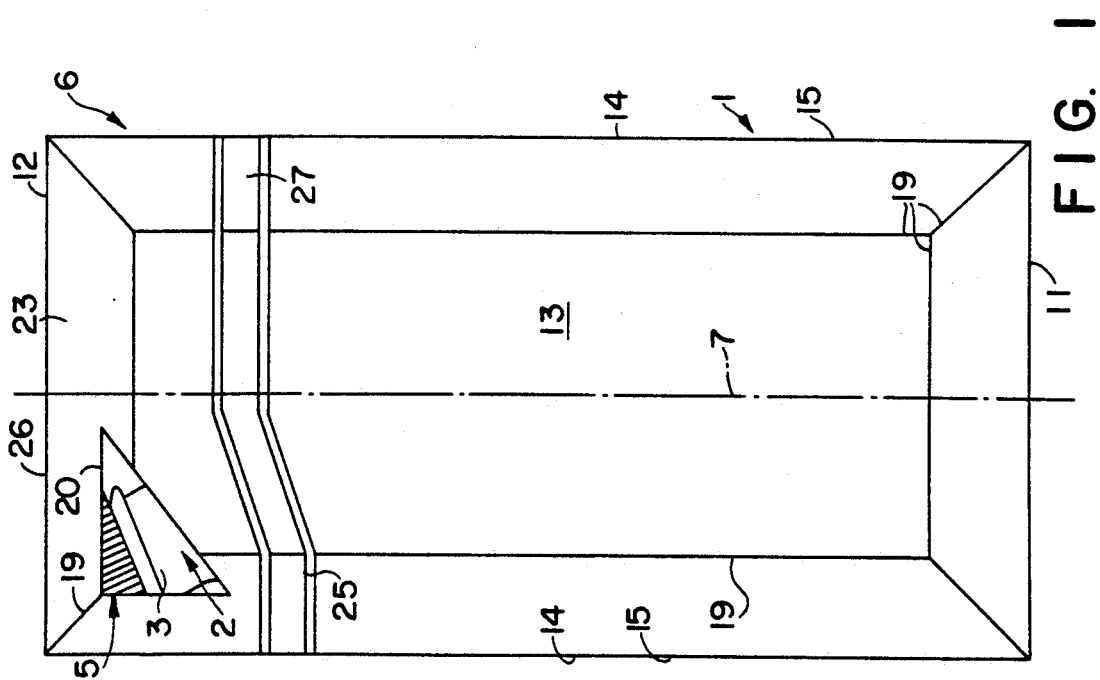
FIG. 1 is an elevation view of a first variant of packaging of the invention in its unbroken state.
Figure 5:
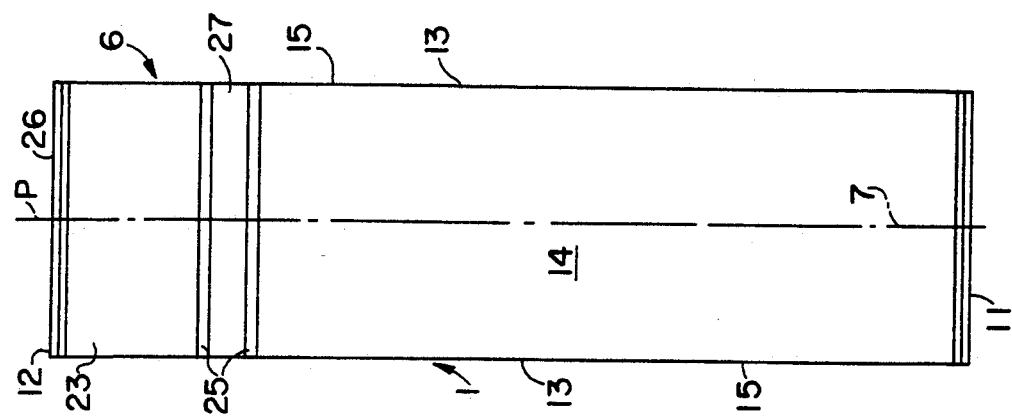
FIGS. 4 and 5 are two side views of the first variant of the FIG. 1 packaging, seen respectively from the left and from the right.
Figure 4:
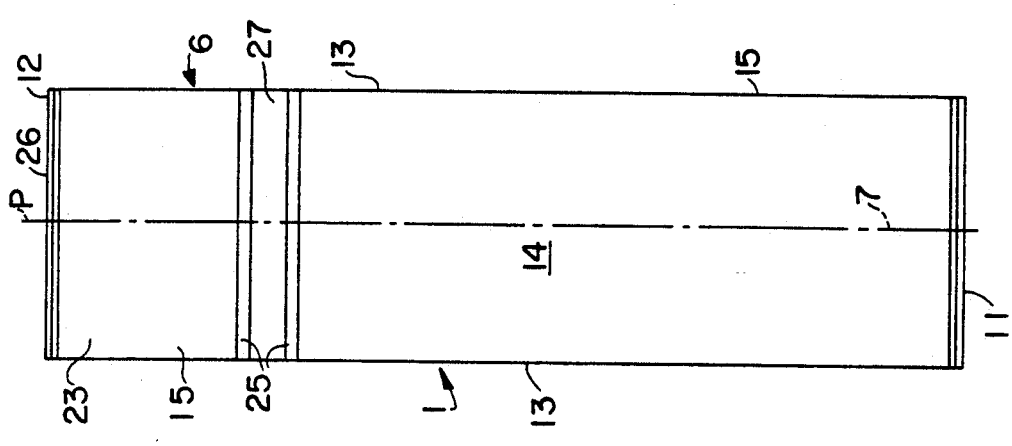
Figure 3:
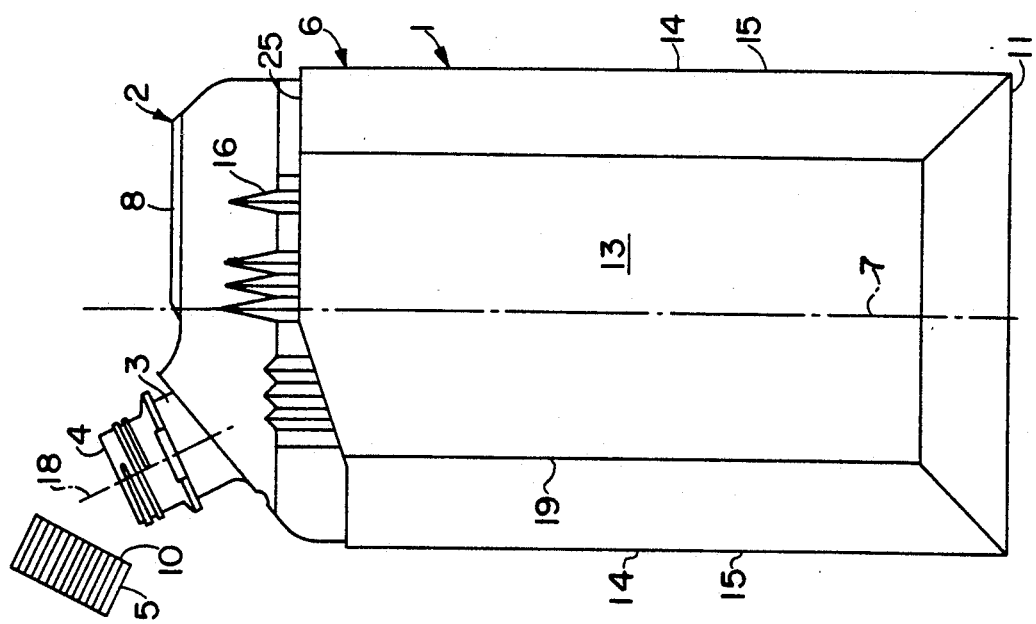
FIG. 3 is an elevation view of the first variant of packaging of the invention derived from FIG. 2, the packaging being shown in a state where use is possible, with the stopper being removed.
Figure 9:
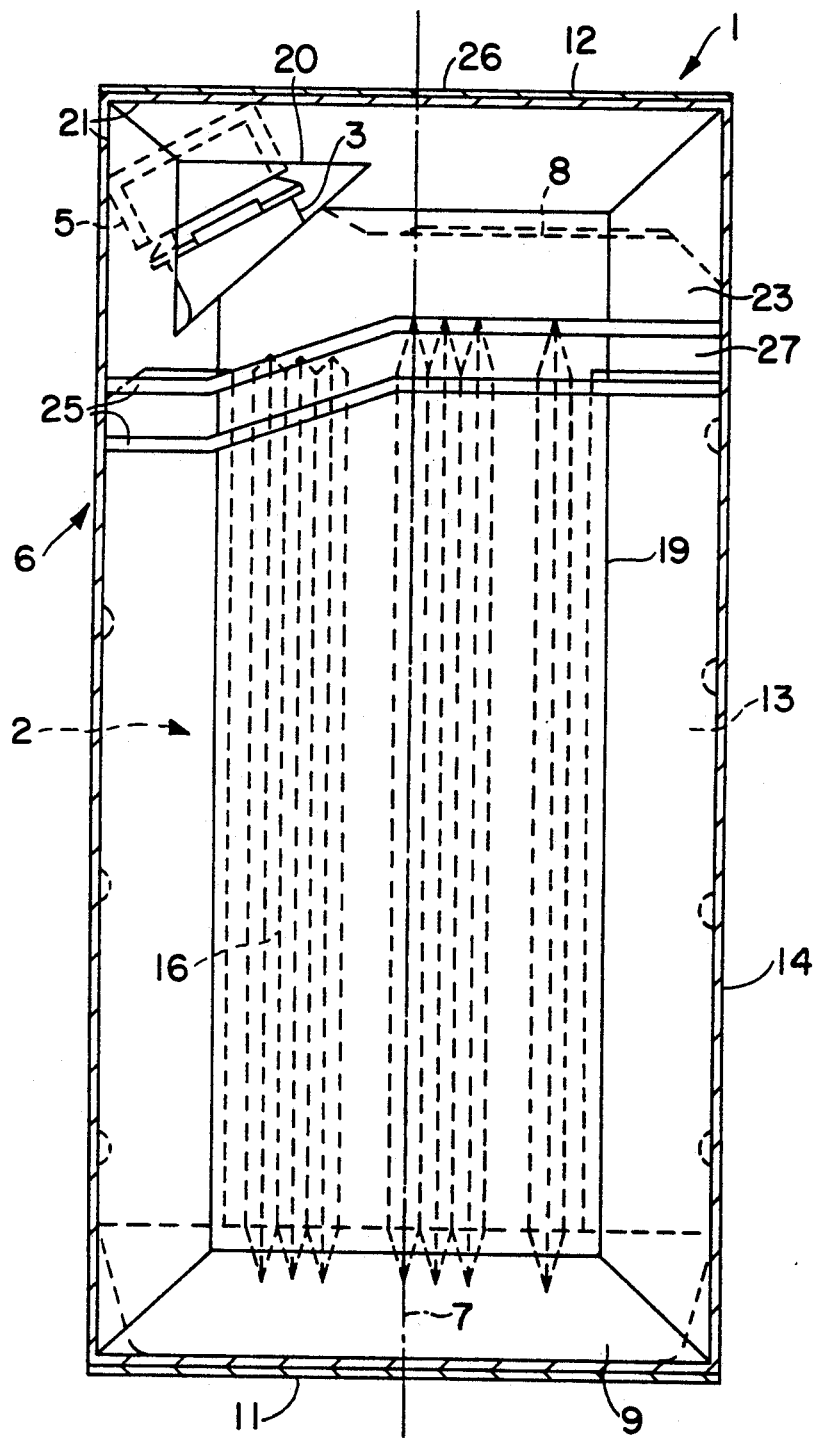

FIG. 9 is a section view on a vertical axial plane through the packaging of FIG. 1.

Figure 10:
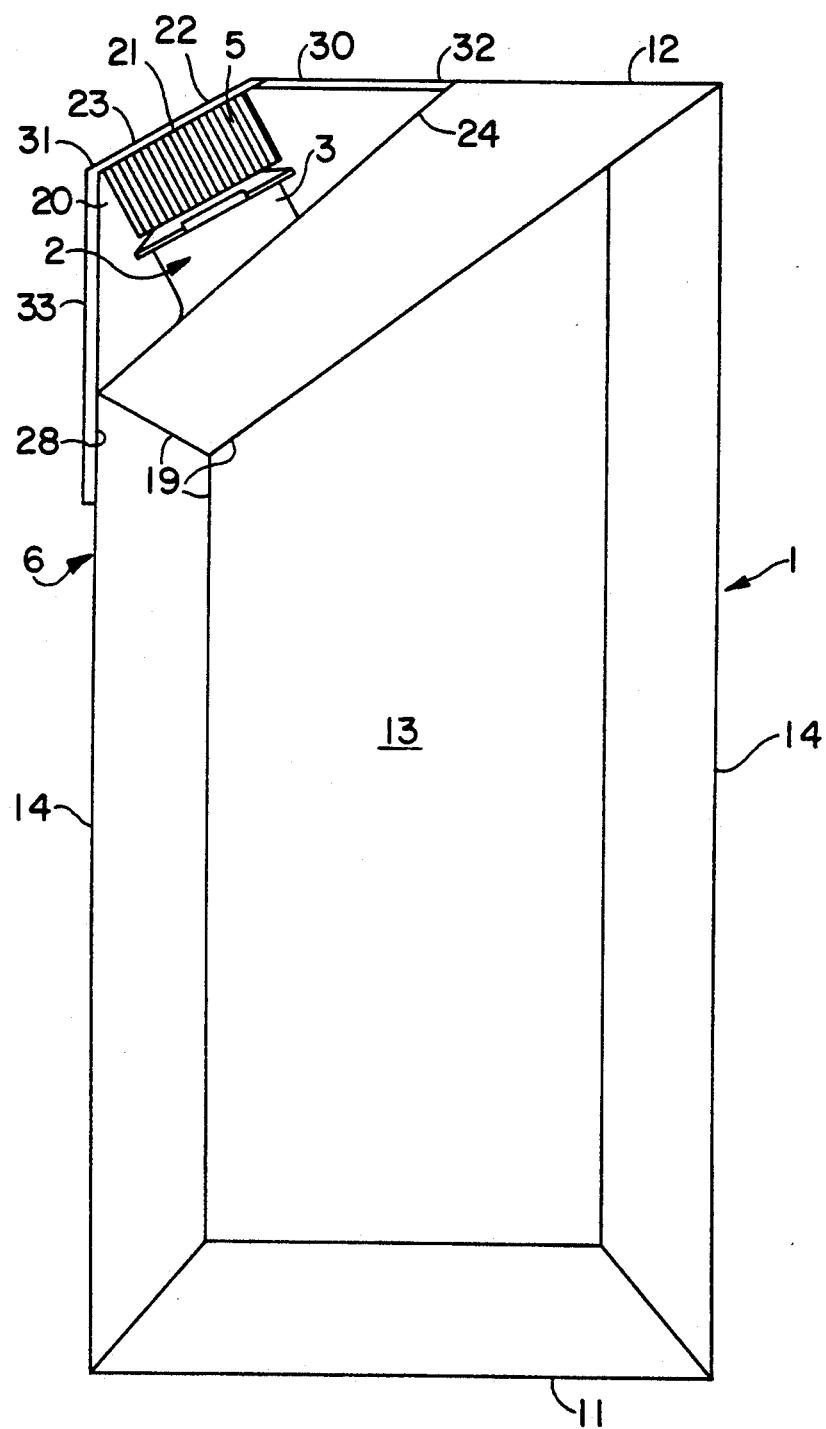

FIG. 10 is an elevation view of a second variant of packaging of the invention.

Figure 11:
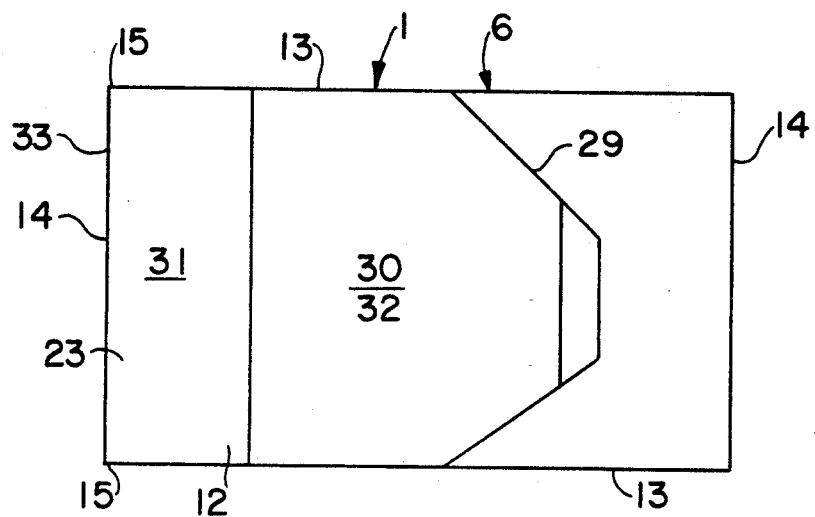

FIG. 11 is a plan view of the second variant packaging of FIG. 10.

Figure 14:
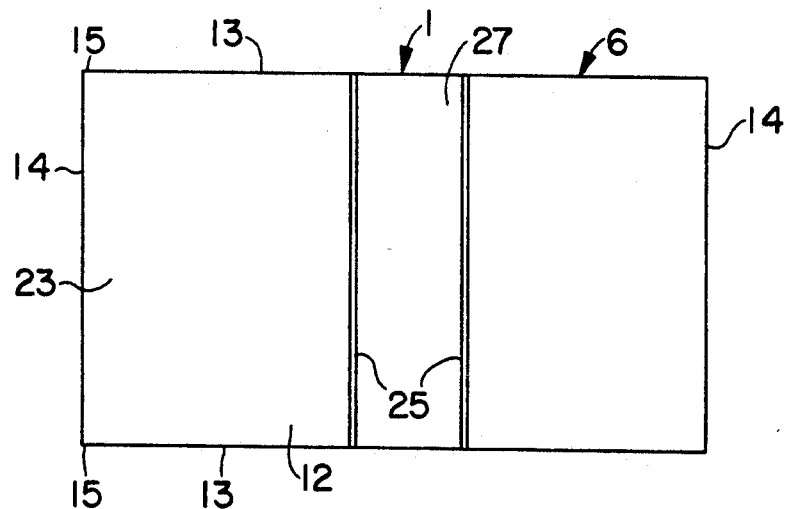

FIGS. 12, 13, and 14 are respectively an elevation view, a left side view, and a plan view of a third variant of packaging of the invention.

The invention relates to packaging 1 for contents such as a liquid, a semi-liquid, a granular solid, or the equivalent, said contents possibly being a beverage, a cleaning material, a cosmetic, or the equivalent, for example.

The packaging 1 is particularly intended for individual use (or near-individual use), i.e. it is transportable and displaceable directly and manually by the user.

For example, in one possible application, the volume of the content of the packaging 1 is about one liter or one-and-a-half liters. However, it is possible for the contents of the packaging 1 to be less, or to be greater, up to about three or five liters.

The packaging 1 is intended more particularly to receive a content which is used in successive fractions over a period of time, with the packaging 1 being reclosed between two uses.

The packaging 1 comprises:

an inner can 2 based on self-supporting shaped plastic having a neck 3 defining an opening 4 through which the content is discharged;

a stopper 5 co-operating with the opening 4 in removable manner with the possibility of being reused; and an outer envelope 6 based on cardboard and shaped around the can 2 for the purpose of holding it.

The can 2 lies substantially within a cylindrical or prismatic shape having a longitudinal axis 7 which is disposed vertically, in particular when the packaging 1 is at rest. The neck 3 is at a first end 8 of the can 2, and in particular at a top end opposite to a bottom 9.

In the embodiment under consideration, the stopper 5 is a screw stopper, its skirt 10 including an inside thread that cooperates with a complementary thread projecting from the neck 3.

The outer envelope 6 is a snug fit, at least in places, around the can 2, thereby enabling the can and the envelope to support each other mutually via sufficient friction. The outer envelope 6 likewise occupies a shape that is generally cylindrical or prismatic, and that is coaxial about the can 2. This structure makes it possible to associate the can 2 and the envelope 6 (and also to separate them) by axial sliding along the axis 7.

In the embodiments described more particularly and shown in the drawings, the packaging 1 is generally in the form of a rectangular parallelepiped comprising a base 11 and a top 12 of generally rectangular outline and interconnected by two pairs of walls, front walls 13 and side walls 14, the walls in each of the two pairs being spaced apart and facing each other, and the four walls 13 and 14 under consideration constituting a lateral envelope about the axis 7 and closed by the base 11 and the top 12.

In an actual embodiment corresponding to the figures, the outer envelope 6 has its base 11 and its top 12 forming rectangles of 6 cm by 12 cm and the height of the outer envelope 6 between the base 11 and the top 12 is 24 cm. However, the packaging 1 could have other dimensions or volume.

The packaging 1 has a middle plane of symmetry P parallel to its two front walls 13.

The front walls 13 and the side walls 14 intersect along edges 15 parallel to the axis 7.

The outer envelope 6 is made by shaping and folding a precutout blank and by fixing it to itself. To this end, the base 11 may comprise four flaps associated by folding to the walls 13 and 14 and fastened to one another by gluing or by equivalent means. In the first and third variants, the same may apply to the top 12. The envelope 6 may also include a handle or loop or the like added thereto (in particular by gluing) or forming an integral portion of the blank by appropriate cutting out and folding. Such a handle or loop is more specifically adapted to cases where the packaging 1 is bulky and heavy (for example if its volume is about 5 liters).

Reference is now made more specifically to FIGS. 6 to 8 which show the can 2. In the embodiment under consideration, the can 2 is made of high density polyethylene. Its wall thickness is thin except in the vicinity of the neck 3 and the opening 4. For example, for a volume of the order of one liter or one-and-a-half liters, its wall thickness may be about 3/10-ths of a millimeter instead of being 8/10-ths of a millimeter as is usually the case for this kind of can. The wall of the can is not completely flexible as would be the case of a floppy bag. The wall of the can 2 can be deformed substantially under the action of external stresses due to manual handling. This means that if a user grasps the can 2 on its own, only the can is deformed by the pressure exerted thereon, while its component walls 13 and 14 which are themselves deformed subsequently return to their original shape due to their initial shaping when the exerted pressure is reduced. If the pressure exerted is large, then the can 2 can be folded or crushed, and this is advantageous if it is to be discarded after use. The lower limit on the thickness of the wall constituting the can 2 is defined by manufacturing stresses and by the fact that the overall shape of the can is to be cylindrical or prismatic as shown in the drawings. The can 2 must also be suitable for receiving its contents. Nevertheless, the can 2 is designed to be used in combination with the outer envelope 6 which acts to provide support and protection.

It is therefore advantageous for the wall thickness of the can 2 to be as thin as possible while simultaneously providing stiffening deformations thereon. Thus, in the embodiment shown in the drawings, elongate stiffening grooves 16 are provided substantially axially in the front walls 13, while elongate stiffening grooves 17 extending orthogonally to the axis 7 are situated in the side walls 14 and also in the first end 8 and the bottom 9. Preferably, these grooves are essentially recessed so that on its outside the can 2 provides a large friction area against the outer envelope 6 for the purpose of providing adequate support. These grooves are also and above all designed to facilitate extraction of the can 2 during manufacture thereof.

For reasons of strength, the wall of the can 2 in the vicinity of the neck 3 and the opening 4 is relatively thick and is substantially undeformable under the action of external stresses due to manual grasping or to closing. In this region the can 2 may be of a thickness that is usual for this kind of can.

Although the stopper shown is a screw cap 5, with the neck 3 then including an outside thread for co-operating with a complementary inside thread on the screw cap 5, it should be understood that other forms of stopper could be envisaged, in which case the neck 3 would include appropriate external projections for co-operating with matching complementary projections of the stopper 5.

According to a characteristic of the packaging 1, the stopper 5 does not have its own tamperproofing means. It may therefore be constituted by a relatively simple conventional stopper. Tamperproofing is then provided by the outer envelope 6 being in an unbroken state, with the outer envelope substantially enclosing the stopper 5.

To ensure optimum utilization of the can 2, in particular when pouring out its contents through the opening 4, the neck 3 is offset sideways and is situated close to one of the side walls 14 (the left side wall in the figures). In addition, the axis 18 of the neck slopes relative to the axis 7, e.g. at an angle of about 30°. In this structure, and as can clearly be seen in FIG. 6, the can 2 provided with its stopper 5 is such that the stopper 5 does not project outside (and is indeed substantially tangential to) the plane Q extending the left side wall 14 adjacent to the stopper 5, thereby making the stopper 5 convenient for enclosing within the outer envelope 6 as already mentioned.

Naturally, the packaging 1 may include additional members associated with the neck 3, the opening 4, and the stopper 5 for the purpose of metering its content, for providing drop-by-drop delivery, etc.

The inner can 2 is usefully held by the outer envelope 6 even when the can 2 is empty but it is held that much more securely when the can 2 (and thus the packaging 1) is full of its content. To ensure that such holding co-operation exists, the dimensions of the can 2 and of the outer envelope 6 are defined as a function of each other. When the can 2 is filled with its content, it tends to bulge outwards, thereby increasing the relative supporting grip between the can 2 and the envelope 6. In the first variant of FIG. 1, friction between the can 2 and the outer envelope 6 provides essentially all of the support for the can 2 inside the outer envelope 6 without there being any need for additional positive supporting or association means. In particular, the can 2 is not glued, welded, or crimped to the outer envelope 6. Consequently, once the packaging 1 has been emptied of its content, it is possible to dissociate the packaging completely into two portions, namely the can 2 and the outer envelope 6. These two portions can be treated separately by the user and they can be discarded into two distinct special-purpose garbage containers. It should be observed that since the can 2 is then empty, sliding and dissociation are made easier. In the second variant, contact and friction participate in supporting the can 2 within the envelope 6, but additional support means are provided as described below.

Consequently, in the first variant, the inner can 2 is supported inside the outer envelope 6 without using any means other than the shape of the outer envelope 6. This shape, this contact, and this friction can be facilitated by forming prefolded lines or grooves 19 on the outer envelope 6, in particular grooves that are parallel and spaced apart from the edges 15 and from the edges of the base 11 and of the top 12. In addition, such prefolded lines or grooves 19 allow the outer envelope 6 to bulge slightly, thereby making it easier for the user to hold in the hand.

On the outer envelope 6, at least so long as it is not broken, the packaging 1 of the invention includes at least one opening 20 situated in the vicinity of the stopper 5 and enabling the stopper to be seen at least in part while nevertheless preventing it from being removed naturally. In this context, the concept of the stopper being visible "at least in part" means that an outside observer can clearly identify the presence of the stopper 5 merely by looking through the opening 20. This disposition prevents the observer being mistaken about the nature of the package 1. If the can 2 and its stopper 5 were to be completely enclosed by the outer envelope 6, then an outside observer would not be in a position to realize that the packaging 1 is of the type that includes an opening, a neck, and a stopper.

The term "preventing natural removal of the stopper" is used to mean that the stopper 5 cannot be removed for the purpose of opening the opening 4 without deliberate and purposeful action requiring the hand or the fingers to be held in an awkward position or else requiring a special tool. The size and position of the opening 20 relative to the stopper 5 are thus suitable for preventing the stopper from being opened naturally. For example, the opening 20 may be offset relative to the stopper 5 (FIG. 1) or else it may be considerably smaller than the stopper 5 (FIG. 1 and FIG. 13) or else it could be offset relative to the direction in which the stopper 5 is removed (FIG. 1, FIG. 11, and FIG. 13).

In combination therewith, so long as the outer envelope 6 is not in the broken state, it may include at least one zone 21 against which the stopper 5 presses so as to prevent it being opened naturally. The zone 21 is spot-shaped, or substantially spot-shaped, or linear, or it extends over an area. In the embodiment under consideration, the stopper 5 is jammed against the envelope 6. In the second variant, as shown in FIG. 10, the opening 20 (and more exactly both openings 20) are large and in any case larger than the stopper 5. However, in this embodiment, the stopper-stopping zone 21 occupies all of the transverse end face 22 of the stopper 5, thereby preventing it from being slid along its axis 18.

Figure 2:
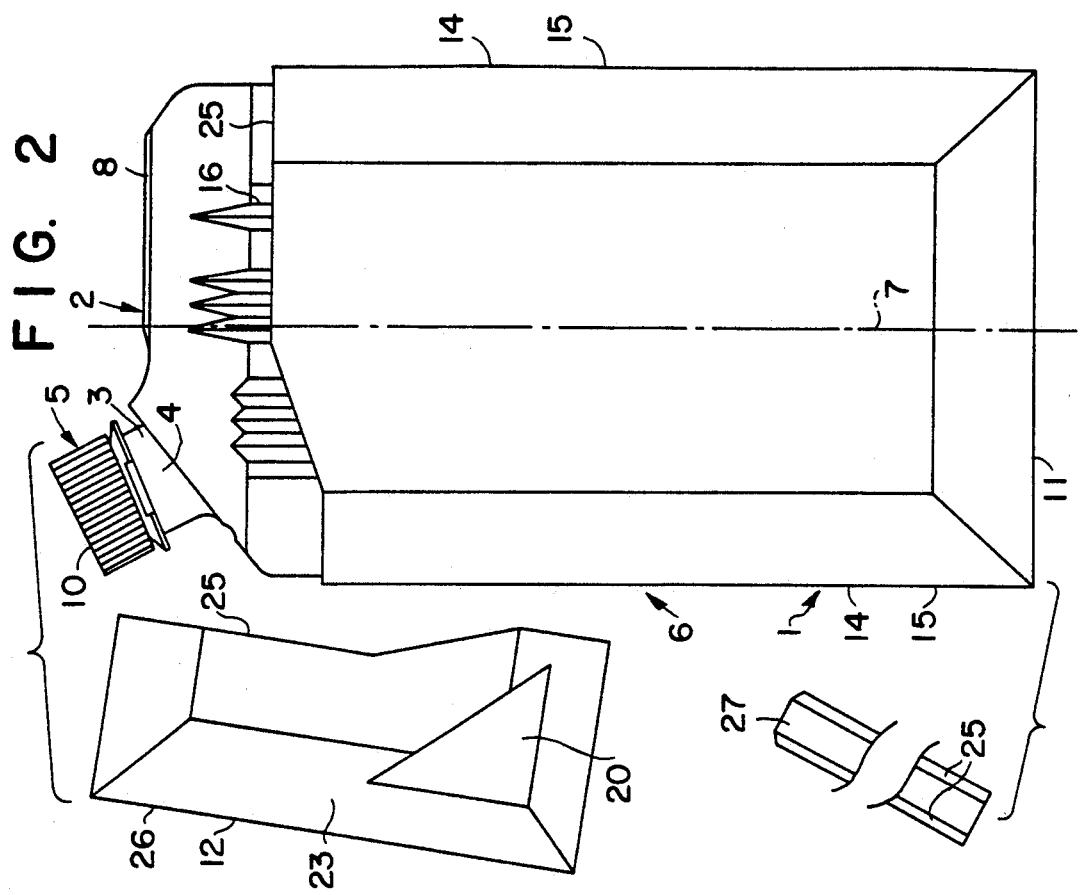
FIG. 2 is an elevation view of the first variant packaging of the invention in its broken state, its component parts being shown separated and its can being shown closed.

According to another characteristic, the region 23 of the outer envelope 6 situated around or in the vicinity of or facing the stopper 5 is designed to be broken off. This region may be broken to go from a non-broken state to a state in which utilization is possible. Such breaking requires the user to perform a deliberate act. Even if the breaking is unwanted or untimely, it nevertheless remains visible. In one possible embodiment, the region 23 comprises or is delimited by at least one line or groove of weakness, or suitable for breaking or cutting. As a result, there is a portion of the outer envelope 6 which is movable relative to or is removable from the remainder thereof, which remainder continues to be associated with the can 2 (FIG. 2).

In another embodiment (FIG. 10), the region 23 includes at least one tab or the equivalent rigidly associated with the remainder of the outer envelope 6 by gluing or the equivalent.

As can be seen from the above, the moving or separable portion of the region 23 in the embodiment under consideration includes the top 12 of the outer envelope 6. In other embodiments, the region 23 may be situated at some other extreme portion of the outer envelope 6.

In the first variant (FIG. 2) the moving or separable portion 23 which includes the top 12 of the envelope is such that after it has been broken off, it is possible by applying sufficient and suitable traction force to overcome the friction between the outer envelope 6 and the can 2 and to separate them completely from each other.

In the second variant (FIG. 10) the top 12 is organized to include a plurality of superposed, cutout, and folded tabs 24 that are secured to one another and that surround the neck 3.

At its end including the stopper 5, in this case at its top 12, the outer envelope 6 includes flaps that are folded and secured to one another, thereby closing the envelope 6. In the first and third variant embodiments, these flaps 26 are disposed symmetrically to the flaps of the base 11.

In the second variant embodiment, those of the flaps which include the tabs 24 participate in holding the can 2 inside the outer envelope 6.

In the first variant embodiment, the breakable portion 23 occupies the entire end portion of the outer envelope 6 constituting the top 12. In contrast, in the second and third variants, the breakable portion 23 occupies only a portion of the top 12.

Reference is now made more particularly to FIGS. 1 to 5 and to the first variant embodiment. In this variant embodiment, the packaging 1 has two openings 20 formed through the front walls 13 close to the top 12, facing each other and also facing the stopper 5. In addition, the stopper 5 is held in place by its edge between its skirt 10 and its transverse face 32 engaging firstly the wall 14 and/or secondly the top 12. The region 23 is constituted by the assembly comprising the base 11 which is made completely removable by tear lines 25 obtained by means of a closed-loop tearoff peripheral strip 27. In the embodiment shown, the strip 27 has a step-shape in the front walls 13, going closer to the top 12 adjacent to the side wall 14 furthest from the stopper 5.

Reference is now made more particularly to FIGS. 10 and 11 and to the second variant embodiment. In this case, the outer envelope 6 includes tabs or flaps 24 that reach the top 12 and that surround the neck 3 at least in part, thereby contributing to holding the can 2 inside the outer envelope 6. The stopper 5 and at least a portion of the neck 3 project relative to said tabs or flaps 24. Also attached to the top 12 there is a tab 30 which is folded through 90°, having an intermediate length 31 such that a first portion 32 extends from the top 12 parallel to the zone 11, a second portion (or intermediate length 31) is pressed against the transverse face 22, and a third portion 33 is applied over and extends the wall 14 and is secured thereto by spots, lines, or zones of glue 28. The openings 20 are then provided between the tab 30 and the tabs or flaps 24 on either side of the neck 3. In this structure, the tab 30 is connected to the top 12 by tear lines, break lines, or lines of weakness 29 (FIG. 11). This makes it possible to remove the holding tab 30 completely.

The third variant differs from the first firstly by the disposition of the tear-off strip 27. Instead of it surrounding the two front walls 13 and the two side walls 14 as provided in the first variant, the tear-off strip 27 in the third variant connects the side wall 14 adjacent to the stopper 5 to the top 12 via a portion that slopes relative to the axis 7. The tear-off portion 23 is then constituted by a corner of the outer envelope 6. In this variant, the opening 20 is made through the side wall 14 facing the stopper 5, with the size of the opening 20 nevertheless being limited. Naturally, the tear-off strip is situated on the top 12 more or less close to the wall 14 adjacent to the stopper 5 and more or less distant from the opposite wall 14, with the slope of the tear-off strip being correspondingly greater or lesser.

The method of making the packaging begins by separately making firstly the can 2 by extrusion blow-molding and secondly the outer envelope 6 open at at least one end by folding a precutout blank of cardboard and by fastening it to itself.

Thereafter the steps are performed of filling the can with its content, of closing the can with the stopper 5, and of associating the can 2 inside the outer envelope 6 by a relative axial sliding motion.

Finally, the method terminates with a step of closing the open end of the outer envelope by folding and by fastening.

In a first variant, the can is filled and closed and then the full can together with its contents is associated inside the outer envelope 6. In another variant implementation, the empty can 2 is associated inside the outer envelope 6, and then it is filled and closed.

We claim:

1. Packaging comprising a rectangular parallelepipedal molded plastic inner can having a capacity of about one to five liters and having elongated stiffening grooves molded therein, the can having relatively large opposite side walls and relatively narrow opposite end walls and top and bottom walls and having a neck surrounding a discharge opening, the neck being disposed in an upper corner of the can on a length of wall of the can that extends between a said end wall and said top wall and that is disposed at an acute angle to a vertical axis of the can, the opening having an axis disposed at an angle of about 15° to 30° to said vertical axis of the can, a stopper for opening and closing said opening, the can having over most of its extent a thin wall that is about 3/10ths of a millimeter thick but having a thicker wall adjacent said neck, and a cardboard outer envelope closely surrounding and contacting and supporting the can, the envelope being of a single piece having fold lines that define rigid panels, the envelope having a portion through which said stopper is visible but through which said stopper cannot be removed without destruction of a portion of the packaging.

2. Packaging as claimed in claim 1, said portion of said envelope comprising a hole through said envelope.

3. Packaging as claimed in claim 1, said grooves extending vertically of said large walls.

4. Packaging as claimed in claim 1, said grooves extending horizontally along said end walls.

5. Packaging as claimed in claim 1, said stopper having screw threads that coact with screw threads on said neck.

6. Packaging according to claim 1, said envelope having a weakened portion adapted to be torn away to expose said neck and to permit removal and replacement of said stopper.

7. Packaging as claimed in claim 6, said weakened portion surrounding an upper end of said envelope whereby when said upper end is torn away along said weakened portion, said can can be removed from a portion of said envelope which remains when said upper end is torn away.

8. Packaging as claimed in claim 7, wherein said can and said portion of said envelope that remains are free from attachment to each other.

9. Packaging according to claim 1, said envelope including a portion against which said stopper is jammed.

10. Packaging comprising a rectangular parallelepipedal molded plastic inner can having a capacity of about one to five liters, the can having relatively large opposite side walls and relatively narrow opposite edge and top and bottom walls and having a neck surrounding a discharge opening, a stopper for opening and closing said opening, and a cardboard outer envelope closely surrounding and contacting and supporting the can, the envelope being of a single piece having fold lines that define rigid panels, the packaging having a portion through which said stopper is visible but through which said stopper cannot be removed without destruction of a portion of the packaging.

11. Packaging as claimed in claim 10, said portion of said packaging comprising a hole through said envelope.

12. Packaging as claimed in claim 10, said stopper having screw threads that coact with screw threads on said neck.

13. Packaging as claimed in claim 10, said envelope having a weakened portion adapted to be torn away to expose said neck and to permit removal and replacement of said stopper.

14. Packaging as claimed in claim 13, said weakened portion surrounding an upper end of said envelope whereby when said upper end is torn away along said weakened portion, said can can be removed from a portion of said envelope which remains when said upper end is torn away.

15. Packaging as claimed in claim 14, wherein said can and said portion of said envelope that remains are free from attachment to each other.

16. Packaging according to claim 10, said envelope including a portion against which said stopper is jammed.

17. Packaging according to claim 10, wherein the packaging includes a strip that extends between two walls of said envelope and extends across and retains aid stopper on said neck.

* * * * *